United States Patent [19]

Wickham

[11] Patent Number: 5,852,687
[45] Date of Patent: Dec. 22, 1998

[54] INTEGRATED OPTICAL TIME DELAY UNIT

[75] Inventor: Michael G. Wickham, Rancho Palos Verdes, Calif.

[73] Assignee: TRW Inc., Redondo Beach, Calif.

[21] Appl. No.: 890,164

[22] Filed: Jul. 9, 1997

[51] Int. Cl.$^6$ ................................................. G02B 6/12
[52] U.S. Cl. ................................. 385/14; 385/37; 385/16
[58] Field of Search ................................. 385/14–23, 10, 385/11, 37, 36, 27

[56] References Cited

U.S. PATENT DOCUMENTS

| | | | |
|---|---|---|---|
| 3,611,400 | 10/1971 | Nagai et al. | 343/844 |
| 3,700,309 | 10/1972 | Skolnick et al. | 350/163 |
| 3,806,223 | 4/1974 | Keck et al. | 350/96 WG |
| 3,999,182 | 12/1976 | Moeller et al. | 343/100 SA |
| 4,079,379 | 3/1978 | Piesinger | 343/100 SA |
| 4,079,381 | 3/1978 | Piesinger | 343/100 SA |
| 4,123,759 | 10/1978 | Hines et al. | 343/854 |
| 4,389,090 | 6/1983 | LeFevre | 350/96.29 |
| 4,612,547 | 9/1986 | Itoh | 343/372 |
| 4,717,918 | 1/1988 | Finken | 342/368 |
| 4,851,025 | 7/1989 | Siefert et al. | 65/31 |
| 4,900,119 | 2/1990 | Hill et al. | 350/96.15 |
| 4,934,774 | 6/1990 | Kalnitsky et al. | 350/96.12 |
| 4,946,251 | 8/1990 | Ashwell et al. | 350/96.34 |
| 5,035,916 | 7/1991 | Kalnitsky et al. | 427/38 |
| 5,109,446 | 4/1992 | Kaltschmidt | 385/24 |
| 5,128,801 | 7/1992 | Jansen et al. | 359/343 |
| 5,140,651 | 8/1992 | Soref et al. | 385/2 |
| 5,222,162 | 6/1993 | Yap et al. | 385/14 |
| 5,233,187 | 8/1993 | Sakata et al. | 250/227.24 |
| 5,289,256 | 2/1994 | Gramling | 356/345 |
| 5,321,774 | 6/1994 | Barnard et al. | 385/16 |

(List continued on next page.)

OTHER PUBLICATIONS

R. M. Jenkins, et al., "Waveguide Beam Splitters and Recombiners Based on Multimode Propagation Phenomena," Optics Letters, vol. 17, No. 14, pp. 991–993, Jul. 15, 1992.

Norio Takato, et al., "Silica–Based Integrated Optic Mach–Zehnder Multi/Demultiplexer Family With Channel Spacing of 0.01–250nm.," IEEE Journal On Selected Areas In Communications, vol. 8, No. 6, pp. 1120–1127, Aug., 1990.

J. M. Heaton, et al., "Novel 1–to–N Way Integrated Optical Beam Splitters Using Symmetric Mode Mixing in GaAs/AlGaAs Multimode Waveguides," Appl. Phys. Lett., vol. 61, No. 15, pp. 1754–1756, Oct. 12, 1992.

Norio Takato, et al., "Silica–Based Single–Mode Waveguides on Silicon and Their Application to Guided–Wave Optical Interferometers," Journal Of Lightwave Technology, vol. 6, No. 6, pp. 1003–1010, Jun., 1988.

K. Inoue, et al., "A Four–Channel Optical Waveguide Multi/Demultiplexer For 5–GHz Spaced Optical FDM Transmission," Journal Of Lightwave Technology, vol. 6, No. 2, pp. 339–345, Feb., 1988.

(List continued on next page.)

*Primary Examiner*—Phan T. H. Palmer
*Attorney, Agent, or Firm*—Michael S. Yatsko

[57] ABSTRACT

A True Time Delay system for creating variable time delays of an optical signal suitable for use with a phased array antenna system in order to avoid beam-squint in broadband applications. The TTD is adapted to be integrated on a planar silica waveguide in order to substantially reduce the package size of the device. In one embodiment of the invention, the TTD is formed from a polarization beam splitter, a polarization rotator and a spiral waveguide. In an alternate embodiment of the invention, the TTD includes a polarization sensitive Mach Zehnder interferometer, a quarter wave polarization rotator and a spiral waveguide. In both embodiments of the invention Bragg reflective gratings are written into the spiral waveguide at different spacings to reflect optical signals of different wavelengths to create various time delays.

13 Claims, 2 Drawing Sheets

U.S. PATENT DOCUMENTS

| | | | |
|---|---|---|---|
| 5,351,324 | 9/1994 | Forman | 385/37 |
| 5,394,239 | 2/1995 | Valette | 356/345 |
| 5,414,443 | 5/1995 | Kanatami et al. | 345/95 |
| 5,455,878 | 10/1995 | Thaniyavarn | 385/16 |
| 5,457,760 | 10/1995 | Mizrahi | 385/37 |
| 5,461,687 | 10/1995 | Brock | 385/37 |
| 5,553,091 | 9/1996 | Delorme | 372/50 |
| 5,555,088 | 9/1996 | Valette | 356/350 |
| 5,613,995 | 3/1997 | Bhandarkar et al. | 65/384 |
| 5,623,270 | 4/1997 | Kempkes et al. | 342/372 |

OTHER PUBLICATIONS

B. H. Verbeek, et al., "Integrated Four–Channel Mach–Zehnder Multi/Demultiplexer Fabricated With Phosphorous Doped $SiO_2$ Waveguides on Si," Journal Of Lightwave Technology, vol. 6, No. 6, pp. 1011–1015, Jun., 1988.

N. Takato, et al., "Low–Loss High–Silica Single–Mode Channel Waveguides," Electronic Letters, vol. 22, No. 6, pp. 321–322, Mar. 13, 1986.

INTEGRATED OPTICAL TIME DELAY UNIT

BACKGROUND OF THE INVENTION

1. Field of the Invention

The present invention relates to an optical time delay and more particularly to an integrated True Time Delay (TTD) for creating variable time delays in an optical signal which may be used for beam steering for phase array antenna systems which avoids beam-squint over broadband applications.

2. Description of the Prior Art

Phase array antenna systems are generally known in the art. Examples of such antenna systems are disclosed in U.S. Pat. Nos. 3,611,400; 3,999,182; 4,079,379; 4,079,381; 4,123,759; 4,612,547; and 4,717,918. Such antenna arrays normally consist of a number of linearly arranged antenna elements that form an array. The antenna elements are normally coupled to a single RF modulated optical signal source. Since the antenna elements are fixed in position, the radiation direction can be altered or steered by controlling the electrical phase of the optical signal applied to each of the individual antenna elements. The phase control of the individual antenna elements allows the composite beam to be scanned over an area of interest without movement of an antenna.

Such phased array antenna systems, for example, as disclosed in U.S. Pat. No. 4,123,759, are known to include phasing circuits for altering the phase of the signal applied to the individual antenna elements as well as a mechanical switch for connecting the phasing circuits to the individual antenna elements to provide the desired beam steering. Unfortunately, phased array antenna systems which rely on phase shifting normally provide proper delays at only a single frequency, and as such severely limit the bandwidth capabilities of the system.

Another problem with such phased array antenna systems is a phenomena known as beam-squint where the antenna beam points in different directions for different frequencies within the bandwidth of the antenna. In order to solve this problem, True Time Delay (TTD) systems have been used. In such TTD systems, the RF signal which may be an RF signal modulated on a optical carrier are time delayed rather than phase shifted. Examples of known TTD systems are disclosed in U.S. Pat. Nos. 4,717,918; 5,222,162; and 5,461,687. Such TTD systems eliminate the need for phase shifting and switching networks which eliminates many of the problems, such as beam-squint, associated with such systems.

TTD systems, for example, as illustrated in FIG. 1 and generally identified with the reference numeral 20, are known to include a plurality of reflective elements 22, 24, 26, 28 and 30, for example, Bragg gratings, written into a elongated fiber optic cable 32. Each of the Bragg gratings 22, 24, 26, 28 and 30 are written for different optical wavelengths. Input optical signals are applied to an input port, port 1 and pass through an optical circulator 34 and into the elongated fiber optic cable 32. When an RF modulated optical signal is applied to port 1, it passes through the optical circulator 34 and into the fiber optic cable 32. The optical signal is reflected back to the optical circulator 34 by the Bragg grating written for that particular wavelength. The reflected optical signal then passes back into the optical circulator 34 exits through an output port, port 3. By selecting different wavelengths for the optical carriers and providing Bragg gratings written for those wavelengths, the time delay can be designed to be virtually any amount by varying the spacing of Bragg gratings along the fiber optic cable.

The TTD system 20 illustrated in FIG. 1 has a package size of about 12.5 cubic inches. Unfortunately such TTD systems are known to be used in applications where space is rather limited.

SUMMARY OF THE INVENTION

It is an object of the present invention to solve various problems in the prior art.

It is yet another object of the present invention to provide a True Time Delay (TTD) system for optical signals which has a reduced package size.

Briefly, the present invention relates to a TTD system for creating variable time delays of an optical signal suitable for use with a phased array antenna system in order to avoid beam-squint in broadband applications. An important aspect of the invention is that the TTD system is adapted to be integrated on a planar silica waveguide in order to substantially reduce the package size of the device. In one embodiment of the invention, the TTD system is formed from a polarization beam splitter and a spiral waveguide. In an alternate embodiment of the invention, the TTD system includes a polarization sensitive Mach Zehnder includes a polarization sensitive Mach Zehnder interferometer, a quarter wave polarization rotator and a spiral waveguide. In both embodiments of the invention Bragg reflective gratings are written into the spiral waveguide at different spacings to reflect optical signals of different wavelengths to create various time delays.

BRIEF DESCRIPTION OF THE DRAWINGS

These and other elements of the present invention are readily understood with the following specification and attached drawings wherein.

DETAILED DESCRIPTION OF THE PREFERRED EMBODIMENTS

The present invention relates to a True Time Delay (TTD) system that is adapted to be formed as a silica planar waveguide. By forming the TTD system as a silica planar waveguide, the package size of the device can be reduced from approximately 12.5 cubic inches as discussed above in connection with FIG. 1 to about 0.35 cubic inches for a total volume reduction of about 35. Both embodiments of the invention include a spiral waveguide with Bragg reflective gratings written for different wavelengths at specific spacings along the spiral waveguide portions for the appropriate time delays. As such, the TTD system can be formed to provide virtually any time delays.

Both embodiments of the invention incorporate polarization-dependent beam splitting of the optical signals and utilize reflective devices, such as Bragg gratings. The TTD system illustrated in FIG. 2 utilizes a polarization beam splitter while the TTD system illustrated in FIG. 3 relies on a polarization sensitive Mach Zehnder interferometer.

Figure 1:
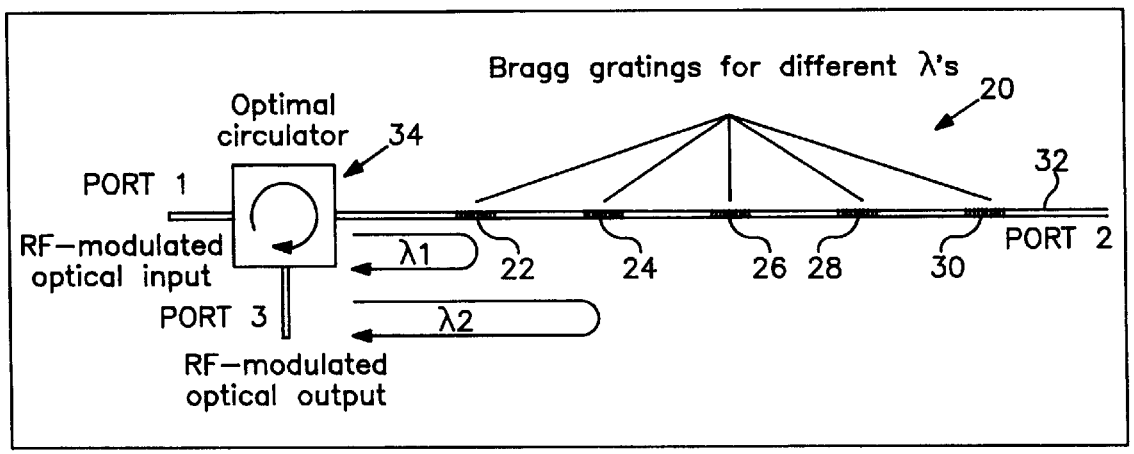
FIG. 1 is a schematic diagram of a known True Time Delay (TTD) system.
Figure 2:
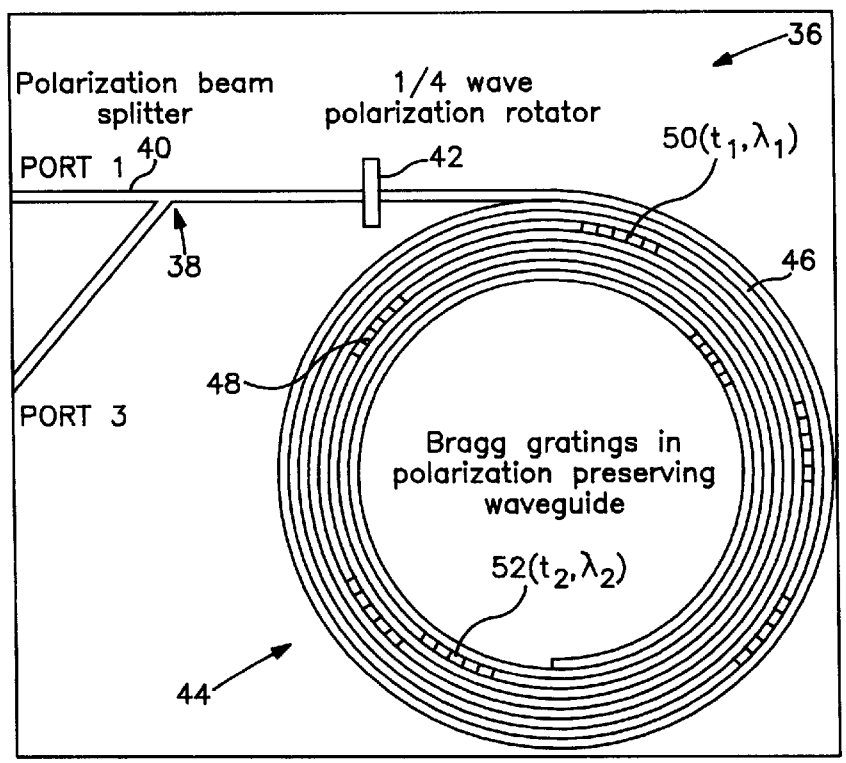
FIG. 2 is an optical schematic diagram of a TTD system in accordance with the present invention.

Referring to FIG. 2, a TTD system in accordance with the present invention is generally identified with the reference numeral 36 and includes an input port, port 1, and an output port, port 3. In this embodiment, the fiber optic core 32 illustrated in FIG. 1, is replaced by an optical waveguide formed with a polarization beam splitter 38, an input leg portion 40, a ¼ wave polarization rotator 42 and a spiral waveguide portion 44. The polarization beam splitter 38, disposed along the input leg portion 40, allows optical signals with polarization in the plane of the chip to pass through the input leg portion 40 and onto the ¼ wave polarization rotator 42. The polarization beam splitter 38 can be formed by a surface mount polarization plate which are known in the art.

A ¼ wave polarization rotation is provided by inserting into the optical circuit, at the point indicated by reference numeral 42, a birefringent element. The birefringent material is epoxied into a slot in the waveguide surface. This element can be inserted with very low loss.

As shown in FIG. 2, the spiral waveguide portion 44 is shown with a number of loops; the loops generally being identified with the reference numeral 46. Depending on the specific time delay, a number of Bragg reflective gratings 48 are written at different spacings along the loops 46. Each of the Bragg reflective gratings may be written into the loops 46 for different wavelengths at different spacings to provide different time delays for optical signals having different wavelengths as discussed above in connection with FIG. 1. For example, as shown a Bragg reflective grating 50 will provide a specific time delay T1 for optical signal having a wavelength of $\lambda 1$, while a Bragg grating 52, for example, will have a relatively longer time delay T2 for an optical signal having a wavelength, for example, of $\lambda 2$. By providing Bragg gratings 48 written for different wavelengths at different spacings along the spiral waveguide portion 44, virtually any time delay is possible. Input optical signals are applied to port 1. Optical signals with polarization in the plane of the chip are passed through the polarization beam splitter 38 and onto the quarter wave polarization rotator 42 and are thus phase shifted by a quarter wavelength. After the optical signals pass through the quarter wave polarization rotator 42, the optical signals are circulated through the spiral waveguide portion 44 and are reflected by the particular Bragg reflective gratings 48 written for the specific wavelength of optical signal. As mentioned above, the spacing of the Bragg reflective gratings is selected to provide the desired time delay.

An important aspect of the invention is that the spiral waveguide portion 44 be formed so as to be polarization preserving. This form of polarization preserving waveguide construction is known in the art and discussed in detail in "Silicon Waveguides on Silicon and Their Application to Integrated-Optic Components," by Masao Kawachi, *NTT IN OPTICAL AND OUANTUM ELECTRONICS*, Vol. 22, pp. 391–416 (1990), hereby incorporated by reference. In other words, the spiral waveguide portion 44 is formed to preserve the polarization of the optical signal output from the quarter wave polarization rotator 42. As such, once the optical signals are reflected by one of the Bragg gratings 48 written in the spiral waveguide portion 44, the optical signal again passes through the quarter wave polarization rotator 42 where the optical signal is again phase shifted by one-quarter wavelength so that the polarization of the reflected optical signal after it exits the quarter wave polarization rotator 42 is 90 degrees or perpendicular to the original polarization state of the optical signal applied to the input port, port 1. Since the reflected optical signal exiting the quarter wave polarization rotator 42 is 90 degrees from the input optical signal applied to port 1, the reflected optical signal will be reflected from the polarization beam splitter 38 and exit the output port, port 3.

Figure 3:
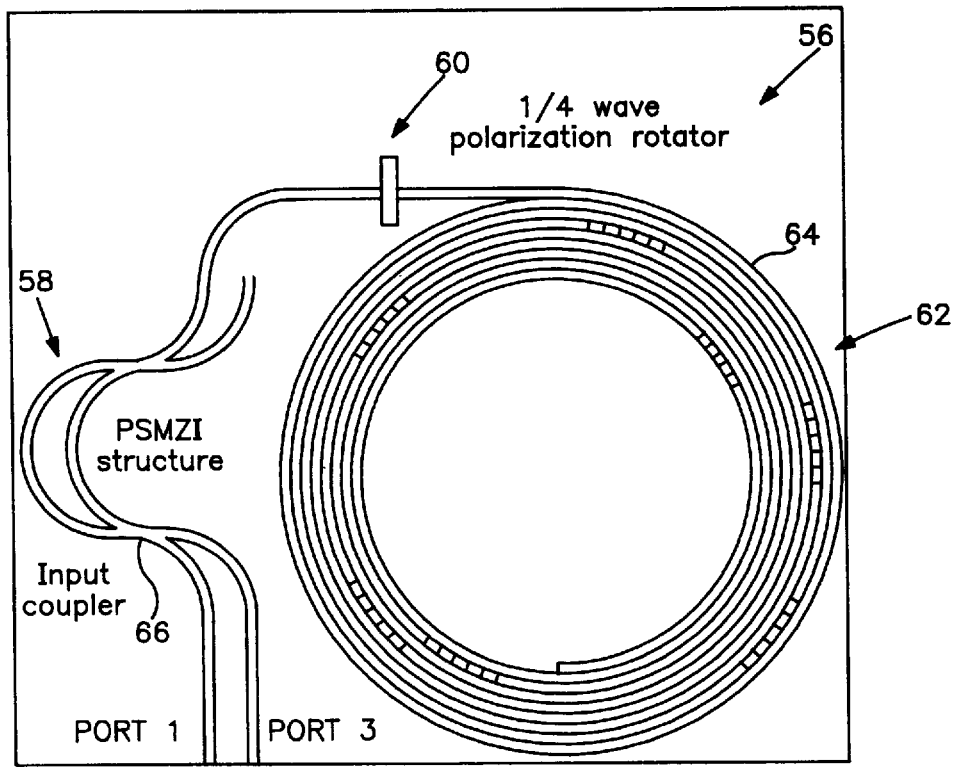
FIG. 3 is an optical schematic diagram of an alternate embodiment of a TTD system in accordance with the present invention.
Figure 4:
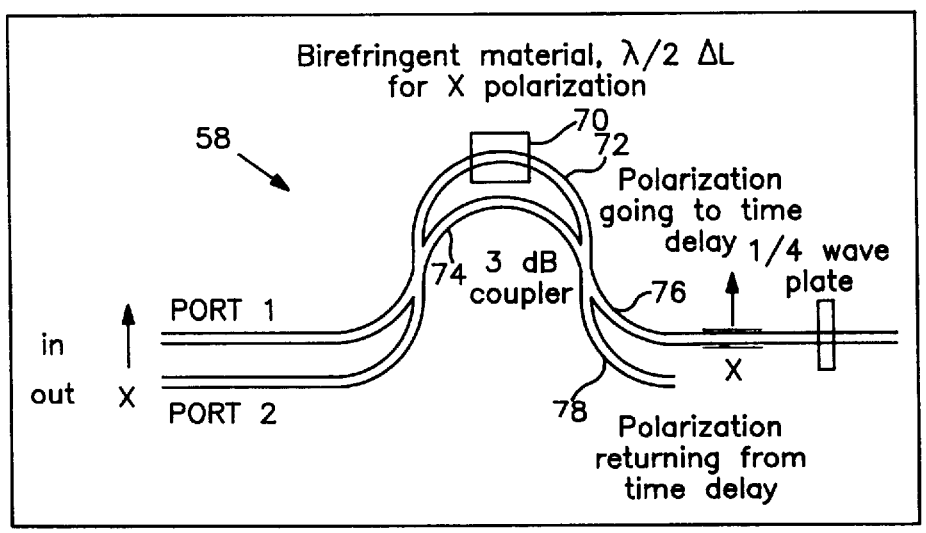
FIG. 4 is an optical schematic diagram of a polarization sensitive Mach-Zehnder interferometer.

An alternate embodiment of the invention is shown in FIG. 3 and is generally identified with the reference numeral 56. In this embodiment of the invention, the optical circulator 34 illustrated in FIG. 1 is replaced with a polarization sensitive Mach-Zehnder interferometer PSMZI 58. As shown in FIG. 4, the PSMZI is a planar silica waveguide structure makes use of a birefringence element 70, disposed in one of the two optical paths 72, 74. The Mach-Zehnder interferometer 58 will have constructive or destructive interference depending on the difference in optical path lengths of the two legs. The outputs of the two complementary outputs is periodic. The transmission of the two outputs is given by the following equation: $T1=\cos^2(Kf)$ and $T2=\sin^2(Kf)$ where T1 and T2 refer to the top and lower outputs 76, 78 in FIG. 4. The constant $K=(n\pi\Delta L)/c$, where n is the index of refraction, $\Delta L$ is the physical path length difference between the two legs and C is the speed of light. To go from a minimum to a maximum in transmission, the frequency and wavelength changes are provided by the following equations $\Delta f=c/(2n\Delta L)$ and $\Delta\lambda=\lambda^2/(2n\Delta L)$. If the paths are birefringent, there will be different K values for the two different polarizations and if conditions are designed so, the complementary outputs 76, 78 can separate the two polarizations as indicated in FIG. 4. In the case of the True Time Delay application, the periodicity of the PSMZI should be 2–3 nm which is the wavelength separation of the gratings written for the various time delays. This periodicity would indicate that $n\Delta L=\lambda^2/(2\Delta\lambda)$ or $n\Delta L=0.4$ mm. If the index of refraction n=1.5 then $\Delta L=0.27$ mm. In order for the two polarizations to be at complementary max-mins, the product $\Delta n\Delta L=\lambda/2$ or a multiple thereof where $\Delta n$ is the difference in the index of refraction of the two polarizations.

The temperature is known to change the effective path length difference as dn/dT and dL/dT. For silica planar waveguide material, $\Delta(n\Delta L/n\Delta L=(1/n)\partial n/\partial T+(1/L)\partial L/\partial T=8.8\times10^{-6}\Delta T$, where T is in degrees centigrade. The temperature sensitivity of he PSMZI device is $\Delta(n\Delta L)/n\Delta L$. For the signal to go from max to min, $\Delta(n\Delta L)=\lambda/2$ or $\Delta(n\Delta L)/n\Delta L=\lambda/2/0.4$ mm or from the expression above, $\Delta T$ would have to be 200° C., which suggest that the device is fairly temperature insensitive.

In this embodiment of the invention, the polarization sensitive Mach-Zehnder interferometer 58 replaces the polarization beam splitter 38 illustrated in FIG. 2 as well as the optical circulator 34 illustrated in FIG. 1. The TTD 56 is formed with an input port, port 1 and an output port, port 3. The TTD system 56, similar to the invention illustrated in FIG. 2, includes a quarter wave polarization rotator 60 and a circular waveguide portion 62. As mentioned above, the quarter wave polarization rotator 60 provides a quarter wavelength phase shift for optical signals transmitted through the rotator 60 and another quarter wavelength phase shift for optical signals reflected back from the spiral waveguide portion 62.

The spiral waveguide portion 62 includes a plurality of loops 64 with reflective Bragg gratings 66 written at different spacings along the loops 64. As discussed above, the specific spacing of the reflective Bragg gratings 66 along the loops 64 determines the specific time delay of the optical provided to any optical signal having a wavelength for which the Bragg gratings 66 was written. As mentioned above, the TTD system 56 is adapted to be utilized with phase array antennas. As such, by selecting optical carriers with different wavelengths and writing the reflective Bragg gratings 48, 66 for those wavelengths, the spacing of the reflective Bragg gratings 48, 66 along the loops 46, 64 of the spiral waveguide portions 44, 62 will provide virtually any time delay.

The polarization sensitive Mach-Zehnder interferometer 58 is formed with an input coupler 66 and provides effective beam splitting of the input and reflected optical signals as a function of the polarization similar to the polarization beam splitter 38 as illustrated in FIG. 2 and discussed above. If a birefringent is used as the waveguide material for the polarization sensitive Mach Zehnder interferometer, constructive interference occurs at the output port. The output optical signal from the output coupler 68 is then phase shifted by the quarter wave polarization rotator 60 as discussed above. The optical signal is then applied to the spiral waveguide portion 62 which includes the Bragg gratings 66. As mentioned above, the Bragg gratings 66 are spaced along the spiral waveguide portion 62 to provide different time delays. The Bragg gratings 66 are also written for optical signals of different wavelengths. Thus, an optical signal applied to the spiral waveguide portions 62 will be reflected back and shifted again by one quarter wavelength by the quarter wave polarization rotator 60. Since the reflected optical signal exiting the quarter wave polarization rotator 60 will be rotated by a total of 90 degrees, destructive interference will occur at the input port, port 1 of the input coupler 66. However, constructive interference occurs at the output port, port 3 which, as mentioned above, is used as an exit port.

In the circulator version of the PSMZI illustrated in FIG. 3, the path length difference is zero for one polarization and $\Delta L$ is $\lambda/2$ for the other polarization. Having $\Delta L$ zero or near zero, $\lambda/2$, makes the circulator broad band. The path length difference $\lambda/2$, for one polarization is achieved with the insertion of a birefringent element 70 (FIG. 4) in one leg. One polarization goes into port one and after returning from the time delay portion, passing through the PSMZI 58, leaves port two. The birefringent element 70 is such that the active axis is perpendicular to the axis of the input polarization. On the way back, after the light passes through the external ¼ wave polarization rotator 60(coming and going), the polarization is rotated 90°. As it passes through the leg with the birefringent element 70, that leg has an extra path length of $\lambda/2$ so the complementary output gets the light.

As mentioned above, both embodiments of the invention relate to monolithic silica planar waveguide devices formed as True Time Delay systems. Such silica based planar waveguides are generally known in the art and are disclosed in "Silica-Based Integrated Optic Mach- Zehnder Multi/ Demultiplexer Family With Channel Spacing of 0.01–250 nm.," by N. Takato, T. Kominato, A. Sugita, K. Jinguji, H. Toba and M. Kawachi, *IEEE JOURNAL ON SELECTED AREAS IN COMMUNICATIONS,* Vol. 8, No. 6, pps. 1120–1127, Aug., 1990; "Silica-Based Single-Mode Waveguides On Silicon And Their Application To Guided Wave Optical Interferometers," by N. Takato, K. Jinguji, M. Yasu, H. Toba and M. Kawachi, *JOURNAL OF LIGHTWAVE TECHNOLOGY,* Vol. 6, No. 6, pps. 10003–100010, Jun., 1988; "A Four-Channel Optical Waveguide Multi/ Demultiplexer for 5-GHz Optical FDM Transmission," by K. Inoue, N. Takato, H. Toba and M. Kawachi, *JOURNAL OF LIGHTWAVE TECHNOLOGY,* Vol. 6, No. 2, pps. 339–345, Feb., 1988; "Integrated Four-Channel Mach-Zehnder Multi/Demultiplexer Fabricated With Phosphorous Dope $SiO_2$ Waveguides on Si," by B. Verbeek, C. Henry, N. Olsson, K. Orlowsky, R. Kazarinov and B. Johnson; and U.S. Pat. Nos. 5,613,995, all hereby incorporated by reference. Such silica planar waveguide integrated circuits are formed generally on a silica substrate by flame hydrolysis deposition and conventional photolithographic techniques followed by reactive ion etching. Flame hydrolysis is based on optical fiber fabrication while photolithographic and reactive ion etching processor compatible with existing silicon technology. Such silicon planar waveguides can be formed in various configurations with relatively high degree of accuracy using the processes discussed above.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A system for providing time delays for an optical signal comprising:

an input port for receiving an input optical signal having a predetermined polarization;

an output port;

an optical splitting device coupled to said input port and said output port for splitting optical signals relative to the polarization of the input optical signal;

a polarization rotating device for rotating the polarization of said input optical signal and reflected optical signals, said polarization rotating device coupled to said optical splitting device and a waveguide device; and a waveguide device coupled to said polarization rotating device, said waveguide device including one or more reflective devices for reflecting optical signals having predetermined wavelengths to said polarization rotating device, said reflective devices spaced along said waveguide for reflecting optical to said output port to provide predetermined time delays of said input optical signal.

2. The system as recited in claim 1, wherein said waveguide is formed as silica planar waveguide and includes a spiral waveguide portion including one or more loops with one or more optical reflective devices.

3. The system as recited in claim 2, wherein said optical reflective devices are Bragg reflective gratings.

4. The system as recited in claim 2, wherein said system is formed as a monolithically integrated device.

5. The system as recited in claim 1, wherein said polarization rotating device and said waveguide device are formed as monolithically integrated silica planar waveguide.

6. The system as recited in claim 5, wherein said optical splitting device is formed as a surface mount polarization plate.

7. The system as rotated in claim 1, wherein said optical splitting device is a polarization beam splitter for splitting optical signals having different polarizations.

8. The system as recited in claim 1, wherein said optical splitting device is a Mach Zehnder interferometer.

9. The system as recited in claim 1, wherein said polarization rotating device is a ¼ wave polarization rotator that rotates the polarization of said output signals.

10. A True Time Delay system for providing predetermined time delays for optical signals, the device comprising:

a silica planar waveguide formed with a spiral waveguide portion defining one or more loops;

one or more reflective gratings written in said one or more loops for predetermined wavelengths and spaced to provide predetermined time delays of optical signals applied to said spiral waveguide portion;

a beam splitting device for splitting beams as a function of the polarization of said optical signals;

a polarization rotating device for changing the polarization of optical signals;

an input port for receiving an input optical signal; and an output port, wherein said polarization rotating device and said beam splitting device are configured to allow optical signals reflected from said reflective gratings to be transmitted to said output port.

11. The TTD system as recited in claim 10, wherein said beam splitting device is formed as a surface mount polarization plate.

12. The TTD system as recited in claim 10, wherein said beam splitting device is a polarization beam splitter.

13. The TTD system as recited in claim 10, wherein said beam splitting device is a Mach Zehnder interferometer.

* * * * *